Nov. 9, 1965

H. W. RICE ETAL 3,216,326

PROGRAM CONTROL SYSTEM AND PARTS
AND METHOD THEREFOR OR THE LIKE

Filed Aug. 26, 1963

INVENTORS
HAROLD W. RICE
DONALD C. PRIDHAM JR.
ROLAND D. BECK
DOUGLAS R. SCOTT

BY

Cauda & Cauda

THEIR ATTORNEYS

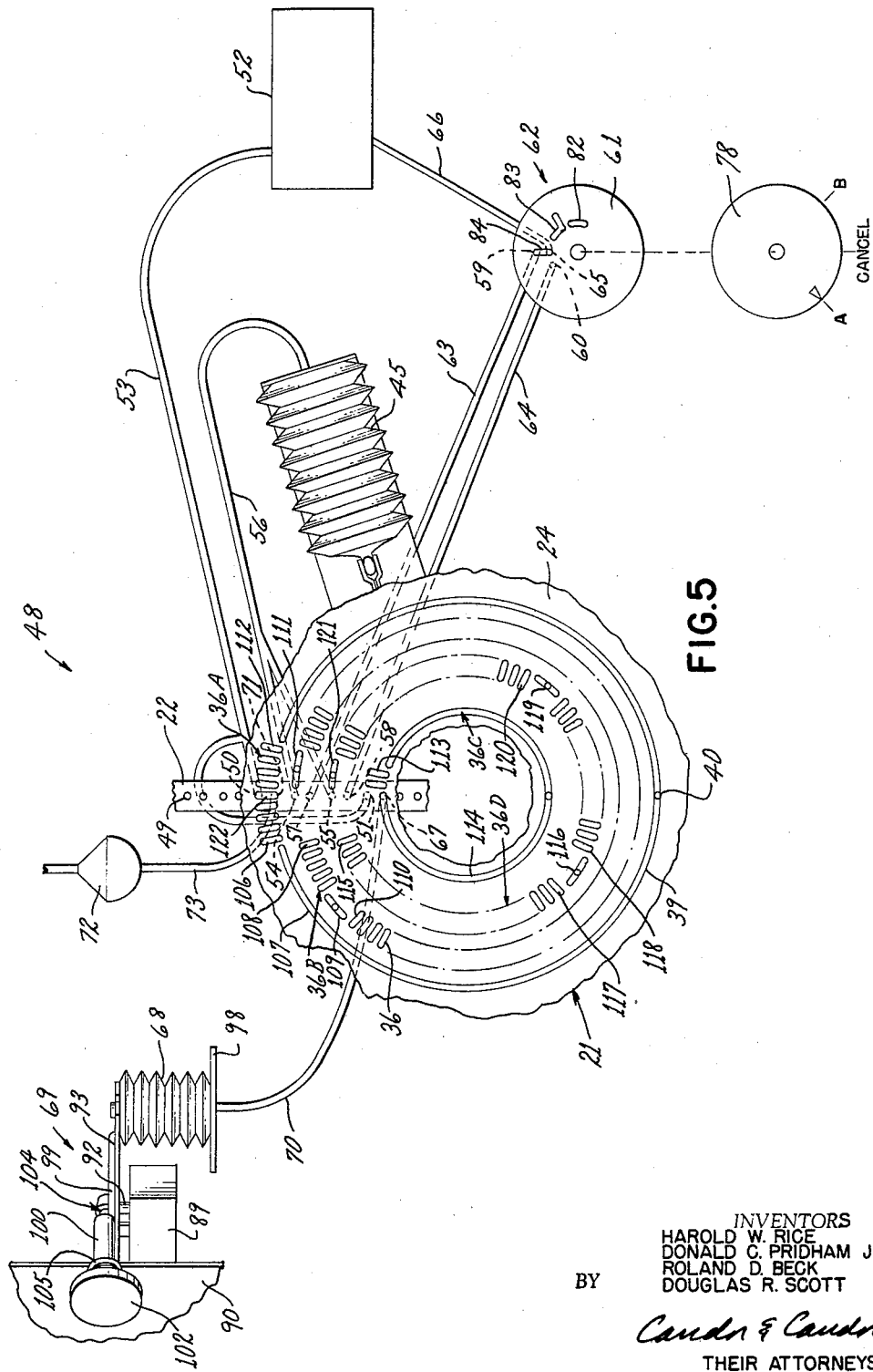

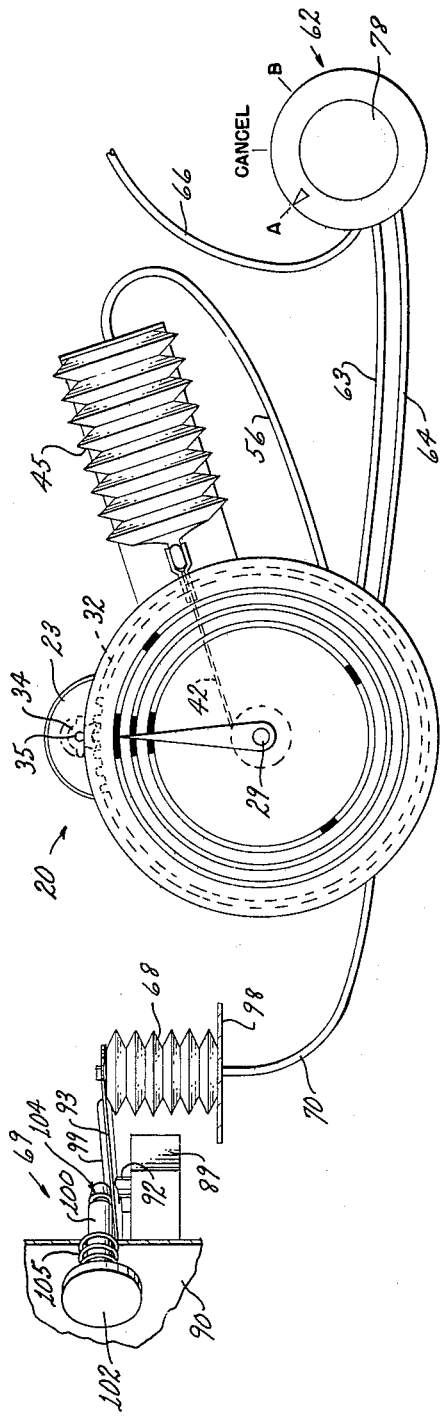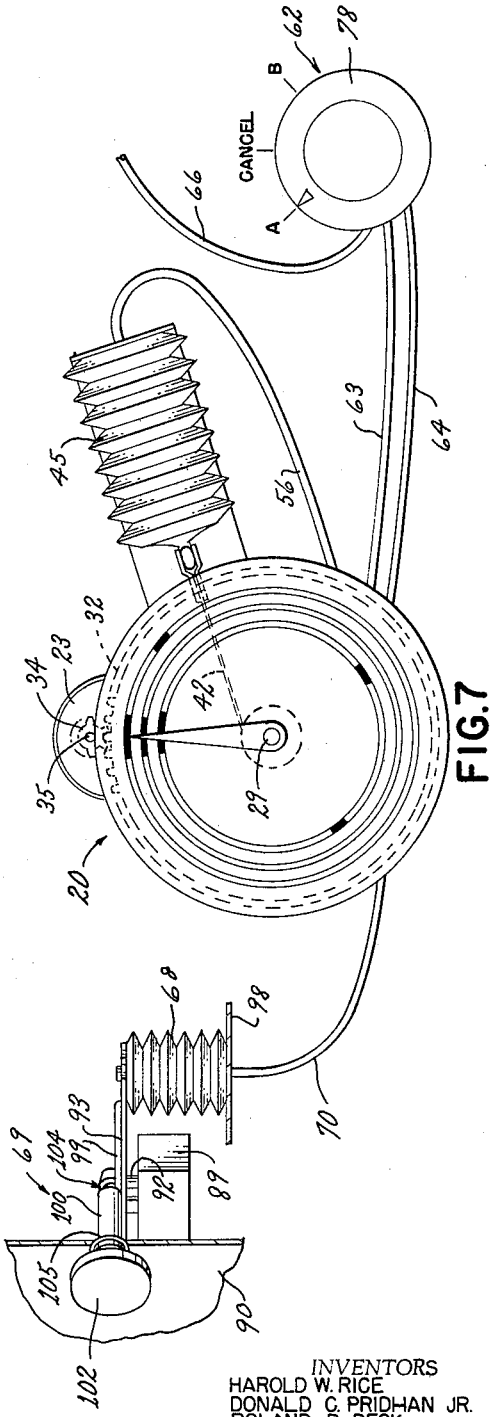

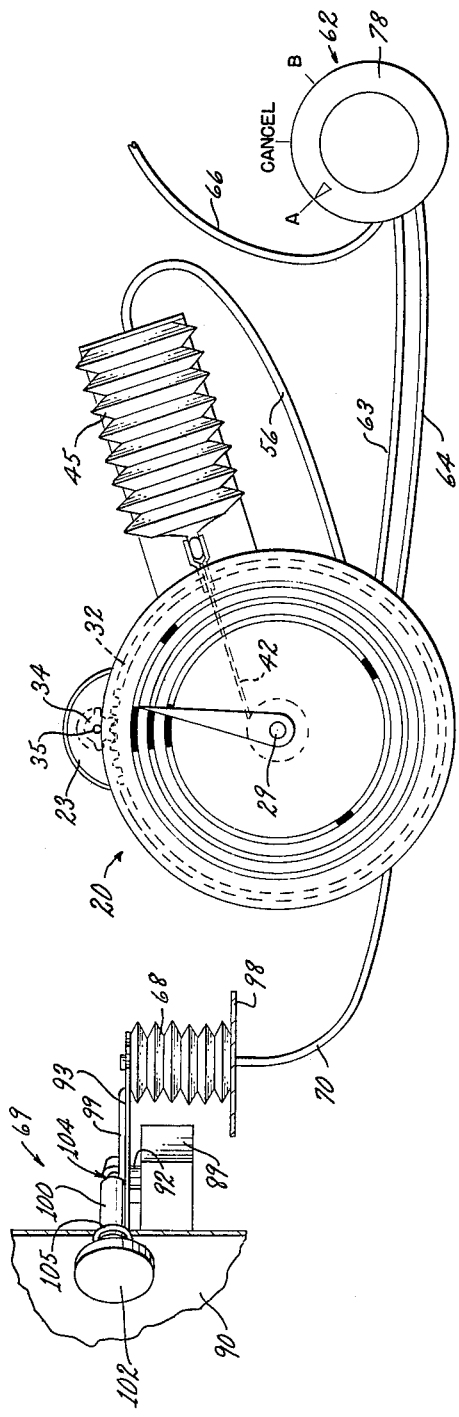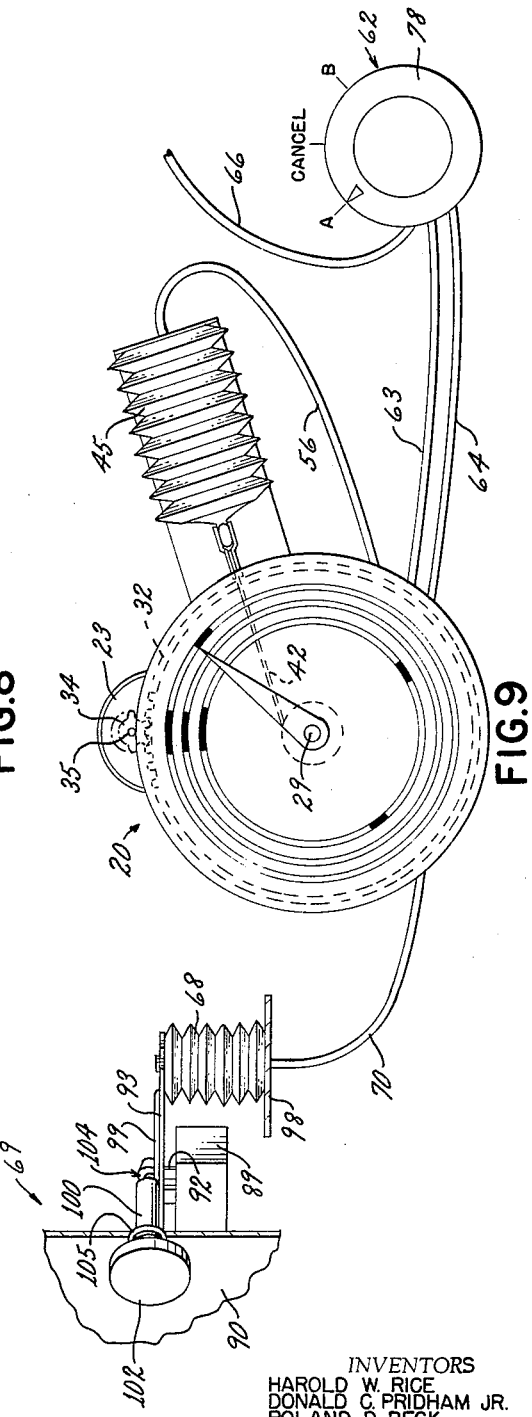

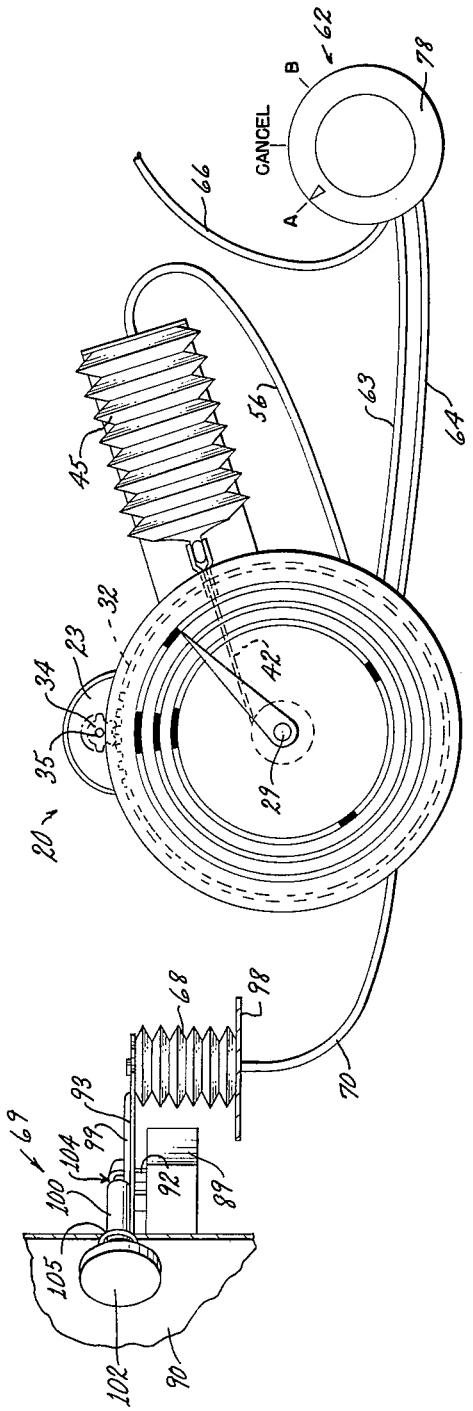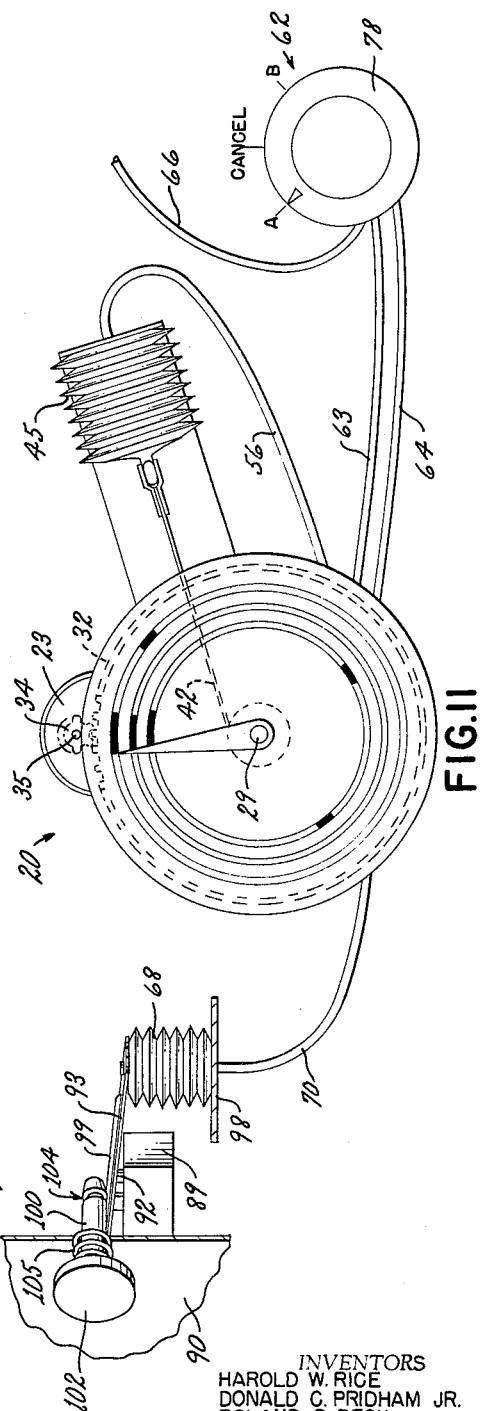
FIG.10
FIG.11
INVENTORS
HAROLD W. RICE
DONALD C. PRIDHAM JR.
ROLAND D. BECK
DOUGLAS R. SCOTT
BY
*Candor & Candor*
THEIR ATTORNEYS

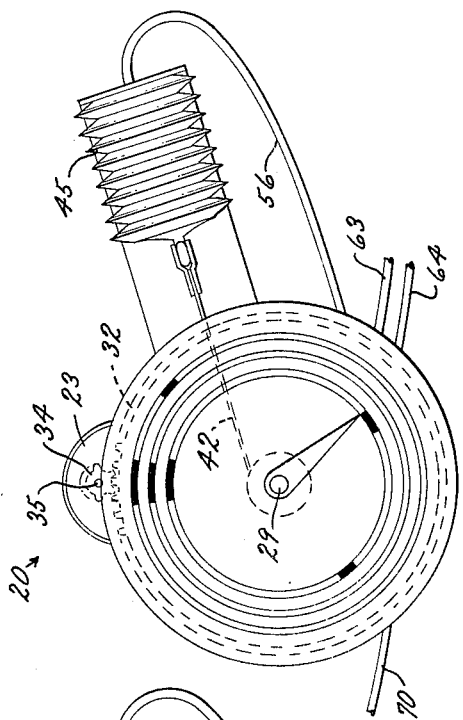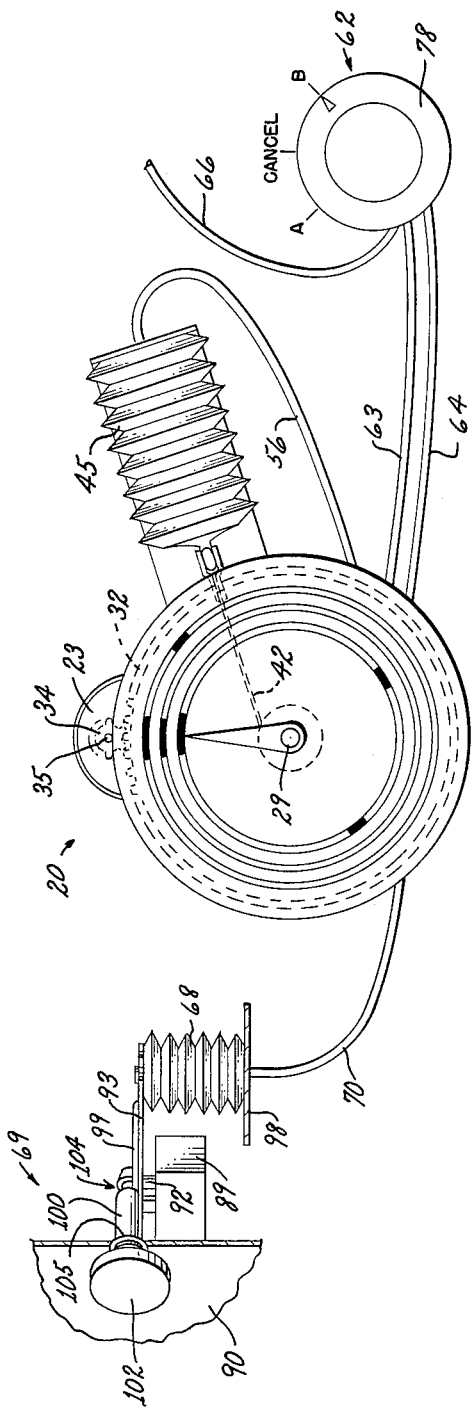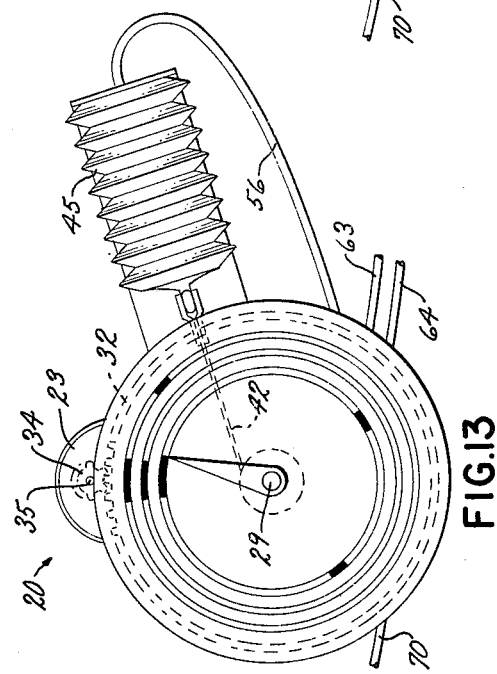
FIG. 12
FIG. 13
FIG. 14
INVENTORS
HAROLD W. RICE
DONALD C. PRIDHAM JR.
ROLAND D. BECK
DOUGLAS R. SCOTT
BY
Cauda & Cauda
THEIR ATTORNEYS United States Patent Office
3,216,326
Patented Nov. 9, 1965

3,216,326
PROGRAM CONTROL SYSTEM AND PARTS AND METHOD THEREFOR OR THE LIKE
Harold W. Rice, Fullerton, Donald C. Pridham, Jr., Orange, Ronald D. Beck, Anaheim, and Douglas R. Scott, Santa Ana, Calif., assignors to Robertshaw Controls Company, Richmond, Va., a corporation of Delaware
Filed Aug. 26, 1963, Ser. No. 304,603
22 Claims. (Cl. 91—36)

This invention relates to an improved program control system or the like as well as to improved parts and methods for such a program control system or the like.

It is well known from the copending patent application, Serial No. 153,300, filed November 20, 1961, and entitled "Pneumatic Programmer" that a program member can be provided for selectively operating various actuators of a domestic appliance or the like in a desired timed sequence upon movement of the program member in the desired direction, the program member being particularly adaptable for use with a vacuum system to selectively interconnect a vacuum source to the actuators for actuation thereof and to selectively interconnect the atmosphere to the actuators to deactivate the same.

However, no means have been previously provided for permitting the program member of the above described program system to control a plurality of different cycles of operation of the same apparatus upon the selectively positioning of a selector knob or the like disposed remote from the program member whereby different programs can be provided for the apparatus by a single program member.

According to the teachings of this invention, such selectively operable means are provided whereby the program member can be remotely controlled by a selector knob or the like to cause the program member to operate the apparatus with a particular program selected by the selector knob.

For example, such a program control system can be utilized with a domestic dishwasher or the like wherein the programmer member and associated parts thereof can be located in any desired position and the selector knob can be located in the dishwasher door or the like whereby the interconnections between the selector knob and the program member can be held at an absolute minimum to eliminate the necessity of a multitude of lines through the pivoted connection of the door to the appliance.

Further, this invention provides a system wherein the program member itself controls the means for changing the particular programs thereof under the influence of the aforementioned selector knob.

Accordingly, it is an object of this invention to provide an improved program controlled system or the like.

Another object of this invention is to provide improved parts for such a program controlled system or the like.

A further object of this invention is to provide improved method for operating such a program controlled system or the like.

Other objects, uses and advantages of this invention are apparent from a reading of this description which proceeds with reference to the accompanying drawings forming a part thereof and wherein:

FIGURE 5 is a schematic view illustrating the various parts of the program controlled system of this invention.

FIGURE 6 is a schematic view illustrating the system of this invention in one operating position thereof.

FIGURE 7 is a view similar to FIGURE 6 and illustrates the program controlled system in another operating position thereof.

FIGURES 8–11 are views similar to FIGURE 6 and illustrate the program controlled system in other operating positions thereof.

FIGURE 12 is a view similar to FIGURE 6 and illustrates the system when selected for another program thereof.

FIGURES 13 and 14 are fragmentary views similar to FIGURE 12 and illustrate the system in other operating positions thereof.

Figure 1:
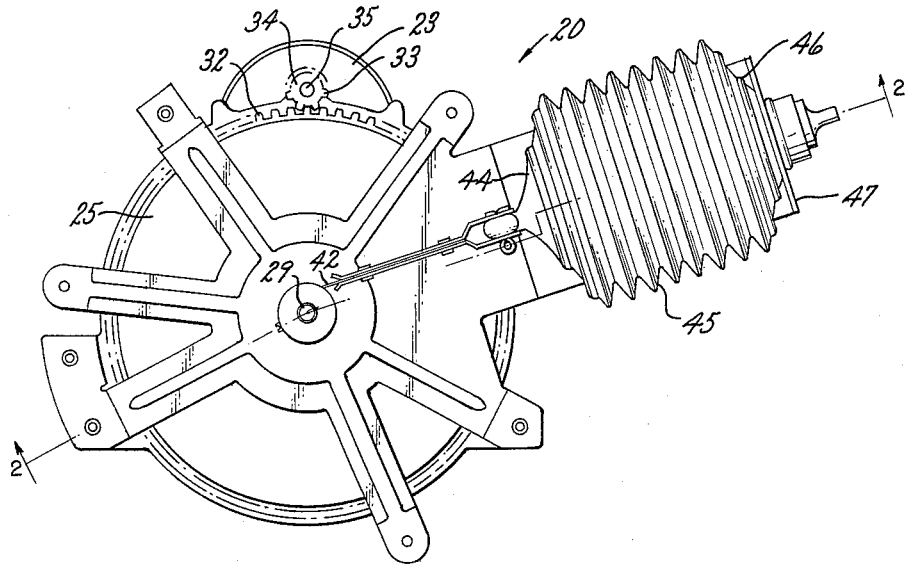
FIGURE 1 is a top view of part of the program controlled system of this invention.

While the various features of this invention are hereinafter described and illustrated as being particularly adaptable for operating a vacuum system for a domestic dishwasher or the like, it is to be understood that the various features of this invention can be utilized singly or in any combination thereof to provide a system or the like for other pneumatic means and for other appliances or apparatus.

Therefore, this invention is not to be limited to only the embodiment illustrated in the drawings, because the drawings are merely utilized to illustrate one of the many uses of this invention.

Figure 2:
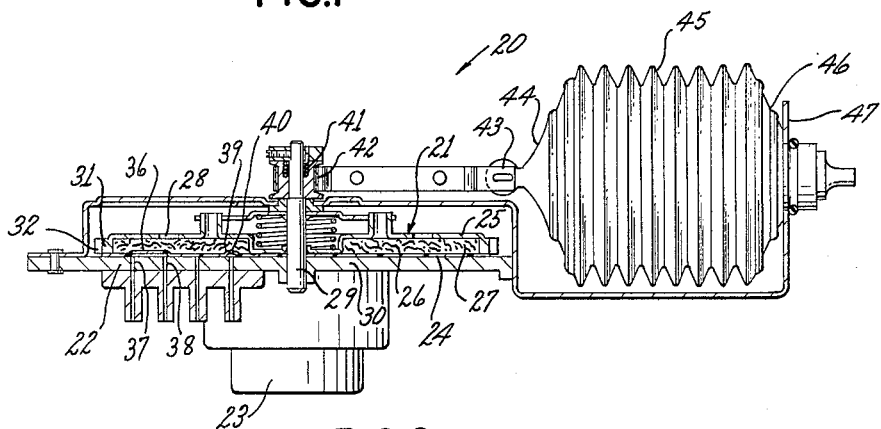
FIGURE 2 is a cross-sectional view taken on line 2—2 of FIGURE 1.

Referring now to FIGURES 1 and 2, an improved part of the system of this invention is generally indicated by the reference numeral 20 and comprises a program member 21 adapted to be rotated relative to a stationary reading head 22 at a predetermined speed by an electrical timer motor 23 in much the same manner as set forth in the aforementioned copending patent application.

In particular, reference is made to the aforementioned copending patent application for the particular details of the program control means 21 and its cooperation with the reading head 22 to provide means for sequentially controlling various vacuum operated actuators which, in turn, control various operations in a domestic appliance or the like.

However, sufficient details of the program means 21 and reading head 22 will now be described in order to fully understand the various features of the present invention.

In particular, the program means 21 comprises a flexible and substantially non-compressible disc-like reading sheet 24 secured to a rigid dome-like backing member 25 which cooperates with the reading sheet 24 to define an annular cavity 26 therebetween, the cavity 26 being filled with a suitable filtering media 27 and being interconnected to the atmosphere by suitable apertures 28 formed through the dome-like member 25.

The dome-like member 25 is fixed to a central shaft 29 rotatably mounted in stationary frame means 30 which carries the reading head portion 22 in a manner hereinafter described.

The outer periphery 31 of the dome-like member 25 of the program member 21 is provided with gear teeth 32 which are disposed in meshing relation with gear teeth 33 on a pinion gear 34 carried on an output drive shaft 35 of the timer motor 23.

Thus, when the timer motor 23 is energized, in the manner hereinafter described, the timer motor 23, through the pinion gear 34, causes rotation of the program means 21 relative to the reading head 22 at a predetermined speed to cause actuation of a plurality of actuators of a desired apparatus in a desired sequence in a manner now to be described.

As illustrated in FIGURES 2 and 5, the reading sheet 24 has a plurality of raised blisters or inverted channels 36 formed therein in a predetermined pattern whereby when each channel 36 passes over the reading head 22, the particular channel 36 is adapted to bridge at least two ports 37 and 38, FIGURE 2, to interconnect the ports 37 and 38 together.

For example, should the port 37 be interconnected to a vacuum source and the port 38 be interconnected to a vacuum operated actuator or the like, the particular blister 36 bridging the ports 37 and 38 will interconnect the vacuum source to the vacuum operated actuator to cause actuation of the same and, thereby, cause a particular operation in the apparatus.

The blisters 36 are so arranged in the program member 24 that a series thereof will continuously bridge a pair of ports in the reading head 22 as the same pass over the same to continuously interconnect the vacuum source to that particular actuator.

However, when it is desired to terminate the actuation of the particular actuator, the program member 24 brings an arcuate blister 39 into register with the vacuum operated actuator port to permit air to return to the actuator and deactivate the same, the arcuate vent blister 39 having an aperture 40, FIGURES 2 and 5, passing through the reading sheet 24 whereby air can first pass through an aperture 28 in the dome-like member 25, the filtering media 27, and through the aperture 40 in the vent blister 39 in the manner illustrated in FIGURE 2 to the vacuum operated actuator to deactivate the same in the manner fully disclosed in the aforementioned copending patent application.

Therefore, it can be seen that by arranging the blisters 36 and 39 in the desired pattern in the program member 24, the program means 21 can selectively operate the actuators of an apparatus or the like in desired sequence upon rotation of the program means 21 by the timer motor 23.

Means are provided in the apparatus 20 illustrated in FIGURES 1 and 2 to override the timer motor 23 in moving the program means 21 relative to the reading head 22 and will now be described, the pinion gear 34 being mounted on the drive shaft 35 of the timer motor 23 with suitable clutch means in the manner set forth in the aforementioned copending patent application to permit the program member 21 to move at a rate faster than that provided by the movement of the pinion gear 34 whereby the timer motor 23 can be overriden for a purpose hereinafter described.

As illustrated in FIGURES 1 and 2, a one-way clutch 41 is interconnected to the shaft 29 of the program means 21 and has one end of a spring 42 interconnected thereto, the spring 42 normally being coiled about the clutch 41 in the manner illustrated in FIGURE 2 and having the other end 43 thereof interconnected to the movable end 44 of a bellows construction 45.

The other end 46 of the bellows construction 45 is fixed to a bracket 47 carried by the frame means 30.

In this manner, when the bellows construction 45 has the chamber thereof evacuated by being interconnected to a suitable vacuum source in a manner hereinafter described, the movable end 44 of the bellows 45 moves to the right in FIGURES 1 and 2 to cause the spring 42 to be drawn to the right and uncoil relative to the shaft 29. As the spring 42 uncoils relative to the shaft 29, the same, through the one-way clutch 41, causes the program means 21 to rotate relative to the reading head 22 at a rate substantially faster than the normal rate of rotation of the program means 21 relative to the reading head 22 under the influence of the timer motor 23 whereby the bellows construction 45 is adapted to override the timer motor 23 to rapidly move the program means 21 relative to the reading head 22 for a purpose hereinafter described.

After the bellows construction 45 has been evacuated and causes movement of the program means 21 to a particular position thereof relative to the reading head 22 for a purpose hereinafter described, the bellows construction 45 can be deactivated by permitting air to return to the chamber thereof whereby the bellows construction 45 expands under the influence of the spring 42 tending to rewind on the one-way clutch 41 of the shaft 29.

During the expansion of the bellows construction 45, the program means 21 is continued to be rotated relative to the reading head 22 under the influence of the timer motor 23 until the bellows construction 45 is again activated to rapidly move the program means 21 relative to the reading head 22 by overriding the timer motor 23.

While the spring means 42 can be formed in any suitable manner, the embodiment thereof illustrated is a negator spring of the type fully disclosed in the United States patents, Numbers 2,609,191, 2,609,192, 2,609,193, and 2,647,743.

The apparatus 20 of this invention is adapted to be utilized in a program controlled system of this invention which is generally indicated by the reference numeral 48 in FIGURE 5 and will now be described.

As illustrated in FIGURE 5, the program sheet 24 of the program means 21 of the apparatus 20 is shown schematically and is partially broken away to illustrate the reading head 22 of the frame means 30 and to illustrate the cooperation of the blisters 36 and 39 relative to the ports 49 in the reading head 22 in a manner hereinafter described.

For example, the ports 50 and 51 of the reading head 22 can be interconnected to a suitable vacuum pump 52 by flexible conduit means 53, the vacuum pump 52 being adapted to be interconnected to various actuators of the system 48 in the manner set forth in the aforementioned copending patent application by means of the reading sheet 24 of the program member 21.

The chamber of the bellows construction 45 of the apparatus 20 is adapted to be interconnected to ports 54 and 55 of the reading head 22 by flexible conduit means 56 in the manner illustrated in FIGURE 5.

Ports 57 and 58 of the reading head 22 are adapted to be interconnected to ports 59 and 60 of a reading head 61 of a selector switch means 62 of this invention by flexible conduit means 63 and 64.

Another port 65 of the reading head 61 of the selector switch means 62 is also adapted to be interconnected to the vacuum pump 52 by a flexible conduit means 66.

A port 67 of the reading head 22 is adapted to be interconnected to the interior of a bellows construction 68 of a start and stop switch construction 69 of this invention by a flexible conduit means 70.

While various of the ports 49 of the reading head 22 can be interconnected to various vacuum operated devices of the desired apparatus, only the port 71 thereof is illustrated as being interconnected to an actuator 72 by a conduit means 73, the actuator 72 being adapted to operate the drain pump motor of a domestic automatic washing machine or the like when a vacuum is imposed on the actuator 72 in the manner hereinafter described.

The particular details of the selector switch 62 of this invention will now be described and reference is made to FIGURE 3.

Figure 3:
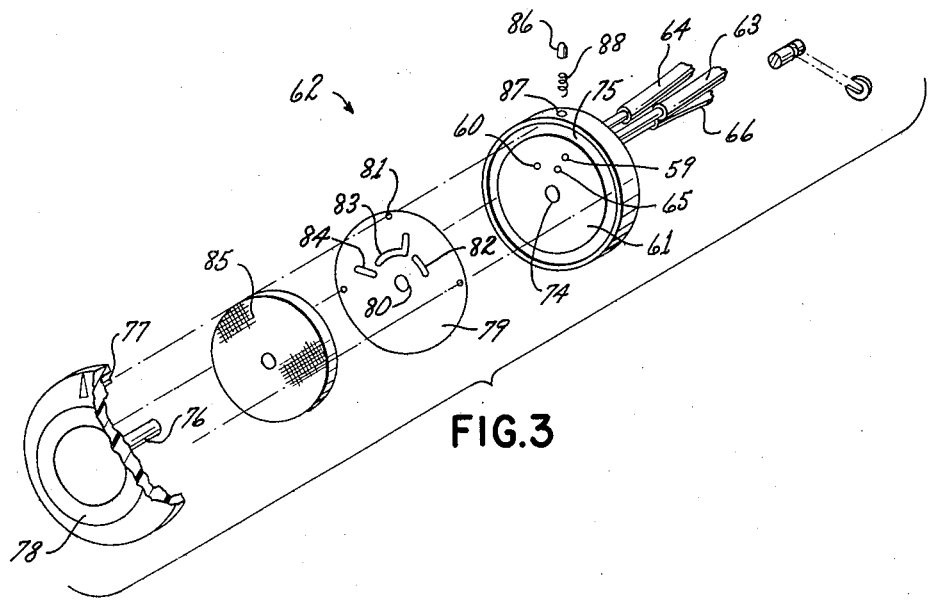
FIGURE 3 is an exploded perspective view of the selector knob means of this invention.

As illustrated in FIGURE 3, the selector switch means 62 of this invention has the reading head 61 thereof provided with a central bore 74 and an annular peripheral recess 75 adapted to respectively receive protrusions or projections 76 and 77 of a selector knob 78.

A reading sheet or disc 79 is adapted to be disposed between the selector knob 78 and the reading head 61, the reading sheet 79 having a central aperture 80 passing therethrough and peripheral apertures 81 passing therethrough to respectively receive the projections 76 and 77 of the selector knob 78.

In this manner, the projections 77 of the selector knob 78 provide a driving connection between the selector knob 78 and the reading sheet 79 to rotate the same relative to the reading head 61 to various positions thereof.

The reading tape 79 has a plurality of blisters or inverted channel means 82, 83 and 84 provided therein.

When the selector knob 78 is disposed in the position marked "A" in FIGURE 5, the blister 84 interconnects together the ports 59 and 60 for a purpose hereinafter described to provide means for causing the program member 21 to operate the apparatus with one program thereof.

When the selector knob 78 is rotated to the position "B" thereof, the blister 82 thereof bridges the ports 60 and 65 in the reading head 61 to cause the reading sheet 24 to operate the apparatus with another program thereof.

When the selector knob 78 is disposed in the position "C" thereof, the blister 83 thereof bridges all three ports 59, 60 and 65 of the reading head 61 to cause the reading sheet 24 to cancel the previous selected program thereof and return the same to an end of cycle position thereof in a manner hereinafter described.

A suitable compressible means 85 is disposed between the selector knob 78 and the reading sheet 79 to hold the reading sheet 79 in sealing contact with the reading head 61 of the selector switch 62, the selector knob being held to the reading head 61 in any suitable manner while being rotatable relative thereto.

In order to locate the selector knob 78 in any of its rotational positions, a suitable detent 86 is urged radially outwardly through an aperture 87 in the reading head 61 by a compression spring 88 to click into suitable recesses formed in the selector knob 78 when the knob 78 is moved to the proper positions thereof.

The particular details of the start and stop switch 69 of this invention will now be described and reference is made to FIGURE 4 wherein it can be seen that a substantially conventional electrical switch 89 is provided and is suitably mounted in a fixed position to a frame means 90 of the domestic appliance by fastening means 91 or the like.

For example, the frame means 90 of the apparatus can comprise the door for the dishwasher or the like.

The electrical switch 89 has a movable plunger 92 for operating the same, the plunger 92 closing the circuit in the switch 89 when the plunger 92 is depressed to interconnect a suitable electrical source not only to the timer motor 23 but also to a motor for the vacuum pump 52 as well as to other electrical devices of the apparatus which are to be actuated by the vacuum operated actuators of this invention.

For example, when the plunger 92 of the switch 89 is depressed, electrical current is directed to the drain pump motor 72 illustrated in FIGURE 5. However, the drain pump motor is not energized until the vacuum operated actuator 72 is evacuated by the reading sheet 24 in a manner hereinafter described.

An actuating arm 93 has one end 94 pivotally carried by the switch means 89. The other end 95 of the actuating blade 93 is interconnected to the movable end 96 of the bellows construction 68, the other end 97 of the bellows construction 68 being fixed to a bracket 98 secured to the frame means 90 in any suitable manner.

The actuating blade 93 of the switch means 69 has a raised portion 99 extending along the length thereof for a purpose hereinafter described.

A shaft-like plunger 100 is movably carried by the frame means 90 and has one end 101 thereof projecting out through the front of the frame means 90 and carries a knob portion 102.

The other end 103 of the plunger 100 defines a truncated cone for a camming purpose hereinafter described, the end 103 being separated from the cylindrical portion of the plunger 100 by an annular recess 104.

The operation of the switch means 69 will now be described.

When it is desired to start the operation of the timer motor 23 of the system 48, the operator merely pushes inwardly on the button portion 102 of the plunger 100 in opposition to a force of compression spring 105 disposed between the frame means 90 and the button portion 102.

As the plunger 100 is moved inwardly, the cam end 103 thereof cams against the actuating blade 93 to cause the same to move downwardly relative to its pivotal connection at the end 94 thereof and partially collapses the bellows construction 68 to cause the plunger 92 of the switch means 89 to close.

Figure 4:
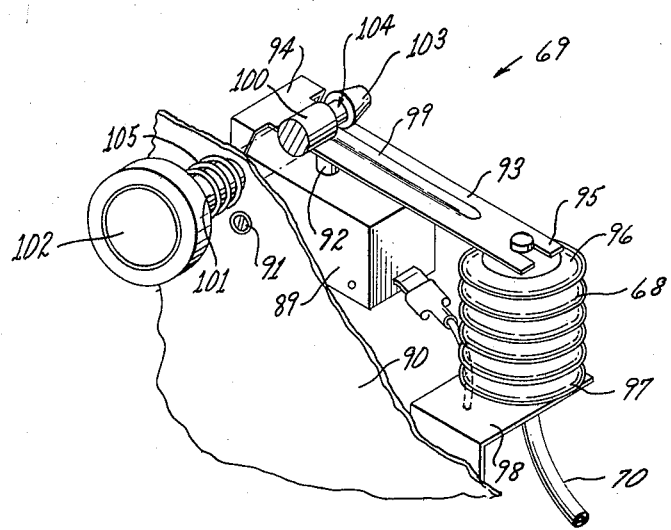
FIGURE 4 is a broken away perspective view of the starting and stopping means for the program controlled system of this invention.

The plunger 100 is held in its inward position by having the raised portion 99 of the actuating blade 93 received in the recess 104 thereof in the manner illustrated in FIGURE 4 whereby the plunger 100 is held in the position illustrated in FIGURE 4 even though the compression spring 105 is tending to move the same upwardly.

Thus, as long as the plunger 100 is disposed in the position illustrated in FIGURE 4, electrical current is supplied to the timer motor 23 and the other electrical devices of the apparatus of this invention as the switch 89 is closed.

When it is desired to terminate the actuation of the switch means 89, the vacuum source is interconnected to the chamber of the bellows construction 68 under the influence of the reading sheet 24 in a manner hereinafter described whereby the movable end 96 of the bellows construction 68 moves downwardly toward the bracket 98 to cause the end 94 of the blade 93 to further pivot relative to the switch means 89 and cause the raised portion 99 of the blade 93 to be withdrawn from the recess 104 of the plunger 100. In this manner, the spring means 105 forces the plunger 100 outwardly beyond the blade 93.

As long as the bellows construction 68 is evacuated and collapsed in the above manner, the bellows construction 68 holds the arm 93 in its downward position to continue to hold the plunger 92 in its down position whereby the electrical current continues to flow through the switch means 89.

However, should the bellows construction 68 be subsequently deactivated by permitting air to return to the chamber thereof, the bellows construction 68 expands causing the movable end 86 thereof to move upwardly whereby the blade 93 moves upwardly in unison therewith about the pivoted end 94 of the blade 93 to permit the plunger 92 to raise to its up position whereby the switch means 89 is disposed in its opened position and all electrical current to the timer motor 23 and other devices of the apparatus of this invention is terminated.

The operation of the system 48 of this invention will now be described.

The operator of the system 48 first determines whether the system 48 is to be run by program A of the selector switch 62 or by program B thereof.

For example, if it is desired to have the system 48 operate on its program A, the operator grasps the knob 78 of the selector switch 62 and moves the same to the A position as illustrated in FIGURES 5 and 6.

Thereafter, the operator pushes in on the knob 102 of the start-and-stop switch means 69 to cause the switch blade 93 to pivot downwardly to the position illustrated in FIGURE 2 to cause the plunger 92 of the switch means 89 to close the switch means 89 whereby electrical current is now delivered to the timer motor 23 as well as to the motor of the vacuum pump 52 and the other motors and electrical devices of the system 48.

At the time the electrical switch 89 is closed, the program sheet 24 of this invention is disposed in the position illustrated in FIGURE 5 whereby a first row of blisters 36A thereof is adapted to bridge the ports 50 and 71 in the reading head 22 to interconnect the vacuum pump 52 to the vacuum operated actuator 72 of the drain pump motor. In this manner, the initial movement of the program sheet 24 in a clockwise direction in FIGURE 5 causes the drain pump motor to empty the dishwasher of all water contained therein.

For example, the first blister 122 of the program sheet 24 of the row 36A of the program sheet 24 is initially bridging the ports 50 and 71 when the timer motor 23 is actuated and the drain pump actuator 72 is interconnected to the vacuum source 52 until after the end blister 106 of the row 36A thereof passes beyond the ports 50 and 71 as illustrated in FIGURE 8.

At this time, a vent blister 107 comes into communication with the port 71 to permit air to return to the vacuum operated actuator 72 to terminate the operation of the drain pump motor.

At the same time, a blister 108 of the row 36B of the program member 24 comes onto the reading head 22 to bridge the ports 55 and 57 so that the vacuum pump 52 can be interconnected to the chamber of the bellows construction 45.

In particular, the vacuum from the pump 52 is interconnected to the bellows construction 45 by means of the blister 84 of the selector switch 62 bridging the ports 65 and 59 thereof to interconnect the vacuum pump 52 to the port 57. Thus, it can be seen that when the blister 108 of the row 36B bridges the ports 54 and 57, the vacuum pump 52 is interconnected to the bellows 45 to cause the bellows construction 45 to start to collapse and pull the spring means 42 to the right to rapidly advance the program member 24 relative to the reading head 22 to the position illustrated in FIGURE 9. At this time, a vent blister 109 is brought into communication with the port 54 to vent the bellows construction 45 to the atmosphere so that further collapsing thereof is prevented and the program member 24 will be advanced from the position illustrated in FIGURE 9 only under the influence of the timer motor 23.

Thus, it can be seen that as the program member 24 is moved from the position illustrated in FIGURE 9 to the position illustrated in FIGURE 10, the program member 24 can utilize other blisters 36 thereof to cause actuation of various vacuum operated actuators in the manner previously described.

However, when the program member 24 reaches the position illustrated in FIGURE 10, another blister 110 of the row 36B thereof comes into contact with the reading head 22 to bridge the ports 57 and 54 to again interconnect the vacuum source 52 to the bellows construction 45 and cause the bellows construction 45 to collapse and rapidly move the program member from the position illustrated in FIGURE 10 to the position illustrated in FIGURE 11. At this time another vent blister 111 of the row 36B comes into communication with the port to deactivate the bellows construction 45.

Therefore, it can be seen that the bellows construction 45 rapidly advances the program sheet 24 relative to the reading head 22 as the bellows construction 45 is being evacuated whereby the program sheet 24 cannot have any of the blisters thereof perform any evacuation of the vacuum operated actuator thereof because of the rate of movement of the program member 24 over the reading head 22.

However, when the program sheet 24 is advanced to the position illustrated in FIGURE 11, the evacuation of the bellows construction 45 is terminated by the vent blister 111 whereby a blister 112 of the row 36A thereof again bridges the ports 50 and 71 to again operate the drain pump actuator 72 to drain the dishwasher of water therein until the program member is again disposed in the position illustrated in FIGURE 5.

However, at the same time that the blister 112 of the row 36A thereof bridges the ports 50 and 71, a blister 113 of a row 36C of the program member 24 bridges the ports 51 and 67 to interconnect the vacuum source 62 to the bellows construction 68 of the start and stop switch construction 69 whereby the bellows 68 is evacuated and collapses in a manner illustrated in FIGURE 11 to permit the plunger 100 to be forced outwardly by the compression spring 105 and free the blade 93 therefrom.

However, the bellows construction 68 remains in its collapsed position until the program sheet 24 returns to the position illustrated in FIGURE 5 whereby a vent blister 114 of the row 36C thereof covers the port 67 to permit air to return to the bellows construction 68 and permit the bellows construction 68 to expand to the position illustrated in FIGURE 6 whereby the plunger 92 of the switch means 89 is in its raised position terminating the supply of electrical current to the timer motor 23 as well as to the other electrical devices of the system 48.

Thus, it can be seen that the bellows construction 45 can be utilized in combination with the program member 21 to cause the same to rapidly move relative to the reading sheet 24 to particular positions thereof so that a particular program can be controlled by the program member 24 even though the program member 24 has other programs thereon.

For example, when the selector knob 78 is turned to the position thereof to cause the program member 21 to provide the program B, the blister 82 thereof bridges the ports 60 and 65 in the reading head 61 so that the vacuum source 52 will be interconnected to the port 58 of the reading head 22. Thus, with the selector knob 78 disposed in the position to provide the program B, the switch means 69 is closed in the manner previously described as illustrated in FIGURE 12 whereby the timer motor 23 moves the program member 24 from the position illustrated in FIGURE 5 causing the row of blisters 36A thereof to operate the drain pump actuator 72 until the vent means 107 comes into contact with the port 71.

When the blister 108 of the row 36B is subsequently moved to bridge the ports 54 and 57, it can be seen that the same cannot actuate the bellows construction 45 because the ports 65 and 59 of the reading head 61 are not interconnected together. Thus, the program member 24 is continued to be advanced by the timer motor 23 until a blister 115 of a row 36D bridges the ports 55 and 58 to interconnect the vacuum source 52 to the bellows construction 45 and, thus, rapidly advance the program member 24 relative to the reading head 22 until a vent blister 116 of the row 36D covers the port 55 to terminate the operation of the bellows construction 45 in the manner illustrated in FIGURES 13 and 14.

During the travel of the program member 24 from the blister 117 of the row 36D to the blister 118 thereof, the program member 24 can cause operation of various vacuum operated actuators in a predetermined sequence to provide a desired portion of a program for the apparatus.

Thereafter, the blister 118 of the row 36D bridges the ports 55 and 58 to cause operation of the bellows construction 45 to again rapidly advance the program member 24 relative to reading head 22 until another vent means 119 of the row 36D vents the port 55 to cause the deactivation of the bellows construction 45.

At this time, the program member 24, under the influence of the timer motor 23, can cause sequential operation of the various vacuum operated actuators until a blister 120 of the row 36D comes into contact with the reading head 22 to bridge the ports 55 and 58 to again cause collapsing of the bellows 45 to rapidly advance the program member 24 until a terminal vent blister 121 covers the port 55 to deactivate the bellows construction 45.

Thus, it can be seen that a different program can be provided for the apparatus by the same reading sheet 24 by merely changing the position of the selector knob 78 before starting the operation of the system 48.

Accordingly, it can be seen that the system 48 of this invention provides a plurality of programs on a single reading sheet 24 thereof and provides a remotely located selector switch 62 to select which program is to be covered by the reading sheet 24, the reading sheet 24 controlling the starting and stopping cycles of operation of the rapid advance bellows construction 45 which overrides the timer motor 23 that normally moves the program member 24 at a predetermined speed.

In this manner, the apparatus 20 of this invention and the vacuum pump 52 can be located in a desired position in the domestic appliance and the selector switch 62 can be located at a readily accessible position therein remote from the apparatus 20 and vacuum pump 52 while still permitting selective operation of the program member 24 in the manner previously described.

For example, the selector switch 62 of this invention can be located in the door of a domestic dishwasher or the like whereby only three pneumatic lines are interconnected to the selector switch 62 and must pass through the pivoted connection of the door whereby the number of lines passing through the pivoted door is held to an absolute minimum.

Should the selector knob 78 of the selector switch 62 be disposed in either the A or B position thereof, and the program member 24 be operated in the manner previously described, the operator can turn the knob 78 to the C position thereof to cancel the particular program being performed by the program member 24 and cause the program member 24 to be rapidly advanced by the bellows construction 45 to its end cycle position whereby the drain pump actuator 72 causes draining of the apparatus and the program means 21 turns itself off in the position illustrated in FIGURE 5.

For example, when the selector knob 78 of the selector switch 62 is disposed in its C position, the blister 83 thereof bridges all of the ports 59, 60 and 65 in the reading head thereof so that regardless of the previously selected program of the reading sheet 24, either the ports 57, 54 or 55, 58 or both combinations of ports will be interconnected by the blisters of the rows 36B and 36D to interconnect the vacuum source 52 to the bellows construction 45 to rapidly advance the program member 54 from any of its operating positions thereof around in a clockwise direction in FIGURE 5 until the vent blister means 111 and 121 of the program sheet 24 vent bellows construction 45. In this manner, the timer motor 23 will move the program member 24 back to the position illustrated in FIGURE 5 after the drain pump actuator 72 has been actuated by the row of blisters 36A in the manner previously described.

During such program cancelling movement of the program means 21, it can be seen that even though the vent blister 109 of the row 36B and the vent blisters 116 and 119 of the row 36D are brought into register with the ports 54 and 55 leading to the bellows construction 45, there is always a blister bridging the ports 54, 57 or 55, 58 at the same time whereby the vacuum source 52 overcomes the effect of the vent means so that the bellows construction 45 continues to be evacuated and will not be terminated until the vent blisters 111 and 121 register with the ports 54 and 55.

Thus, it can be seen that the selector switch 62 of this invention is readily adaptable to selectively cancel a program previously selected thereby at any time during the operation of the selected program to cause the program member 24 to return to its start position and turn off the system 48 in the manner previously described.

Therefore, it can be seen that not only does this invention provide an improved program controlled system and parts therefor, but also this invention provides an improved method for operating such a program controlled system or the like.

While the form of the invention now preferred has been disclosed as required by the statutes, other forms may be used, all coming within the scope of the claims which follow.

What is claimed is:

1. In combination, a program member, means for moving said program member at a selected speed, and means for overriding said moving means to rapidly move said program member to particular positions thereof, said overriding means including an actuator interconnected to said program member by a spring means which when pulled in one direction by said actuator causes the overriding movement of said program member.

2. A combination as set forth in claim 1 wherein said spring means in interconnected to said program member by a one-way clutch.

3. A combination as set forth in claim 1 wherein the movement of said program member is rotational movement.

4. In combination, a pneumatic source, pneumatically operated actuator means, a program member having means to control a program by interconnecting said source to said actuator means, means for moving said program member at a selected speed thereof, and pneumatically operated overriding means controlled by said program member for overriding said moving means to rapidly move said program member to particular positions thereof, said program member controlling the starting cycle and stopping cycle of operation of said overriding means by respectively interconnecting and disconnecting said source from said overriding means.

5. A combination as set forth in claim 4 and including means to cause said program member to operate said overriding means to cancel the program thereof by rapidly moving said program member to an end of cycle position thereof.

6. A combination as set forth in claim 4 and including means to start and stop operation of said moving means.

7. A combination as set forth in claim 6 wherein said last-named means is controlled by said program member to stop the operation of said moving means.

8. In combination, a pneumatic source, pneumatically operated actuator means, a program member having means to control a program by interconnecting said source to said actuator means, means for moving said program member at a selected speed thereof, pneumatically operated overriding means controlled by said program member for overriding said moving means to rapidly move said program member to particular positions thereof, said program member controlling the starting cycle and stopping cycle of operation of said overriding means by respectively interconnecting and disconnecting said source from said overriding means, and selectively operable means operatively interconnected to said program member to cause said program member to operate said overriding means in a desired sequence.

9. In combination, a pneumatic source, pneumatically operated actuator means, a program member having means for controlling a plurality of programs by interconnecting said source to said actuator means, means for moving said program member at a selected speed, pneumatically operated overriding means controlled by said program member for overriding said moving means to rapidly move said program member to particular positions thereof, said program member controlling the starting cycle and stopping cycle of operation of said overriding means by respectively interconnecting and disconnecting said source from said overriding means, and selectively operable means operatively interconnected to said program member to select a particular program thereof so that said program member will control the operation of said overriding means in a particular sequence thereof as determined by said selected program.

10. A combination as set forth in claim 9 wherein said selectively operable means can be selectively adjusted to one position thereof to cause said program member to operate said overriding means to rapidly move said program member to an end of cycle position thereof and thereby cancel the selected program.

11. A combination as set forth in claim 10 wherein said selectively operable means can be adjusted to said program cancel position thereof during any part of the selected program.

12. In combination, a pneumatic source, pneumatically operated actuators, a program member having means to control a program of operation of said pneumatic actuators by interconnecting said source to said actuators, means for moving said program member at a selected speed thereof to control the normal operation of said actuators, and pneumatic actuator overriding means controlled by said program member for overriding said moving means to rapidly move said program member to particular positions thereof so that said moving means can again move said program member at said selected speed, said program member controlling the starting cycle and stopping cycle of operation of said overriding means by respectively interconnecting and disconnecting said source from said overriding means.

13. In combination, a program member having means to control a program of operation of pneumatic actuators, means for moving said program member at a selected speed thereof to control the normal operation of said actuators, pneumatic actuator means controlled by said program member for overriding said moving means to rapidly move said program member to particular positions thereof, said program member controlling the starting and stopping cycle of operation of said overriding means, and selectively operable means pneumatically interconnected to said program member to cause said program member to operate said overriding means in a desired sequence.

14. In combination, a program member having means for controlling a plurality of programs of operation of pneumatic actuators, means for moving said program member at a selected speed for normal operation of said actuators, pneumatic actuator means controlled by said program member for overriding said moving means to rapidly move said program member to particular positions thereof at a rate of speed great enough to prevent operation of said actuators as said program member is being rapidly moved, and selectively operable means pneumatically interconnected to said program member to select a particular program thereof so that said program member will control the operation of said overriding means in a particular sequence thereof as determined by said selected program.

15. A combination as set forth in claim 14 wherein said selectively operable means comprises a program member disposed remote from said first-named program member.

16. A combination as set forth in claim 14 wherein said selectively operable means is located in a pneumatic line leading from a pneumatic pump to said program member.

17. In combination, a rotatable program member having means to control a program of operation of pneumatic actuators, means for rotating said program member at a selected speed thereof to control the normal operation of said actuators, and pneumatic actuator means controlled by said program member for overriding said moving means to rapidly rotate said program member to particular positions thereof so that said rotating means can again rotate said program member at said selected speed, said program member controlling the starting cycle and stopping cycle of operation of said overriding means, said pneumatic actuator means comprising a bellows construction which only rotates said program member as said bellows construction collapses.

18. A combination as set forth in claim 17 and including spring means attached to said bellows construction and to said program member to expand said bellows construction.

19. A combination as set forth in claim 18 wherein said spring is a negator spring.

20. In combination, a rotatable program member having means to control a program of operation of pneumatic actuators, means for rotating said program member at a selected speed thereof to control the normal operation of said actuators, a pneumatic actuator means controlled by said program member for overriding said moving means to rapidly rotate said program member to particular positions thereof so that said rotating means can again rotate said program member at said selected speed, said program member controlling the starting cycle and stopping cycle of operation of said overriding means, said actuator means comprising a bellows construction, a shaft carried by said program member to rotate in unison therewith, a one-way clutch carried by said shaft, a spring having one end secured to said clutch and the other end secured to said bellows construction, said spring having a portion thereof coiled on said shaft whereby collapsing of said bellows construction by said program member causes said spring to rotate said program member and expansion of said bellows construction by said program member causes said spring to coil around said shaft without rotating said program member.

21. In combination, a program member, means for moving said program member at a selected speed, and means for overriding said moving means to rapidly move said program member to particular positions thereof, said overriding means including an actuator interconnected to said program member by a spring means which when pulled in one direction by said actuator causes the overriding movement of said program member, said actuator comprising a bellows construction.

22. In combination, a program member having means to control a program of operation of pneumatic actuators, means for moving said program member at a selected speed thereof to control the normal operation of said actuators, and pneumatic actuator means controlled by said program member for overriding said moving means to rapidly move said program member to particular positions thereof so that said moving means can again move said program member at said selected speed, said program member controlling the starting cycle and stopping cycle of operation of said overriding means, said pneumatic actuator means comprising a bellows construction.

References Cited by the Examiner

UNITED STATES PATENTS

| 2,703,714 | 3/55 | Demby | 179—100.2 |
| 2,863,287 | 12/58 | Berkman | 91—52 |
| 2,974,639 | 3/61 | O'Connor | 91—385 |

FRED E. ENGELTHALER, *Primary Examiner.*